(12) United States Patent
Higuchi et al.

(10) Patent No.: US 8,872,765 B2
(45) Date of Patent: Oct. 28, 2014

(54) ELECTRONIC DEVICE, PORTABLE TERMINAL, COMPUTER PROGRAM PRODUCT, AND DEVICE OPERATION CONTROL METHOD

(75) Inventors: Yasukazu Higuchi, Kanagawa (JP); Takehide Yano, Tokyo (JP); Masaaki Kikuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 198 days.

(21) Appl. No.: 13/556,957

(22) Filed: Jul. 24, 2012

(65) Prior Publication Data

US 2013/0176204 A1 Jul. 11, 2013

(30) Foreign Application Priority Data

Jan. 6, 2012 (JP) ................................. 2012-001343

(51) Int. Cl.
*G09G 5/00* (2006.01)

(52) U.S. Cl.
USPC ........................................................ 345/156

(58) Field of Classification Search
None
See application file for complete search history.

(56) References Cited

U.S. PATENT DOCUMENTS

| | | | |
|---|---|---|---|
| 2008/0320500 A1* | 12/2008 | Li et al. ......................... | 719/324 |
| 2009/0219174 A1 | 9/2009 | Kikuchi et al. | |
| 2009/0288126 A1* | 11/2009 | Candelore et al. ............ | 725/110 |
| 2010/0134411 A1* | 6/2010 | Tsumura et al. ............... | 345/156 |
| 2011/0211131 A1 | 9/2011 | Kikuchi et al. | |
| 2012/0098771 A1* | 4/2012 | Kondo et al. .................. | 345/173 |
| 2012/0306739 A1* | 12/2012 | Tsuda ............................ | 345/156 |

FOREIGN PATENT DOCUMENTS

| | | |
|---|---|---|
| JP | 2004-208290 | 7/2004 |
| JP | 2009207058 | 9/2009 |
| JP | 2010147550 | 7/2010 |
| JP | 2011061487 | 3/2011 |
| WO | WO 2010026717 | 3/2010 |

OTHER PUBLICATIONS

Japanese Patent Application No. 2012-001343, Notice of Rejection, mailed Oct. 23, 2012, (with English Translation).
Japanese Patent Application No. 2012-001343, Notice of Rejection, mailed Mar. 19, 2013, (with English Translation).

* cited by examiner

*Primary Examiner* — Adam R Giesy
(74) *Attorney, Agent, or Firm* — Blakely, Sokoloff, Taylor & Zafman LLP (57) ABSTRACT

According to one embodiment, an electronic device includes]: a connected device information management module; a connected device information sending module; an operation state sending module; and a connected device operation module. The connected device information management module is configured to manage function information of an external device connected to the electronic device. The connected device information sending module is configured to send the function information of the external device to a portable terminal in response to a transmission request from the portable terminal. The operation state sending module is configured to send an operation state of the electronic device with respect to the external device in response to the transmission request from the portable terminal. The connected device operation module is configured to perform a functional operation of the external device specified by a request sent from the portable terminal.

4 Claims, 8 Drawing Sheets

ELECTRONIC DEVICE, PORTABLE TERMINAL, COMPUTER PROGRAM PRODUCT, AND DEVICE OPERATION CONTROL METHOD

CROSS-REFERENCE TO RELATED APPLICATIONS

This application is based upon and claims the benefit of priority from Japanese Patent Application No. 2012-001343, filed on Jan. 6, 2012, the entire contents of which are incorporated herein by reference.

FIELD

Embodiments described herein relate generally to an electronic device, a portable terminal, a computer program product, and a device operation control method.

BACKGROUND

In general, a remote controller attached to an input and output device for video images and audio, such as a video recorder, or a display device, such as a television, is used to control operations of the input and output device or operations of the display device.

In recent years, as an interface for connecting input and output devices of video images and audio, display devices, and the like, the use of the high-definition multimedia interface (HDMI) has been widespread. In the HDMI, a control device signal and a control protocol called consumer electronics control (CEC) are standardized for controlling the devices by one another.

As a technique using the HDMI-CEC or an infrared (IR) blaster, a technique for remotely controlling operations of an input and output device connected to a display device through a cable with a remote controller of the display device has been developed.

Functions of operating the input and output device with the remote controller of the display device using the HDMI-CEC or the IR blaster include: changing an operation target device in conjunction with input switching; and performing only specific operations set on an device, such as channel switching at the start of programmed recording.

When an operation target is to be changed among a plurality of target devices, screen display of the display device is undesirably changed to an input switching screen or a setting screen. As a result, the operation target cannot be changed without changing the current screen display, such as a currently viewed video.

Furthermore, conventional device operating devices such as a universal remote controller can change an operation target device without changing a screen display of a display device. However, a connection state of the device with respect to the display device and a state of a screen display of the display device cannot be checked. Therefore, a user needs to operate these devices while determining an operation target device, resulting in poor operability.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises: a connected device information management module; a connected device information sending module; an operation state sending module; and a connected device operation module. The connected device information management module is configured to manage function information of an external device connected to the electronic device. The connected device information sending module is configured to send the function information of the external device to a portable terminal in response to a transmission request from the portable terminal. The operation state sending module is configured to send an operation state of the electronic device with respect to the external device in response to the transmission request from the portable terminal. The connected device operation module is configured to perform a functional operation of the external device specified by a request sent from the portable terminal.

Figure 1:
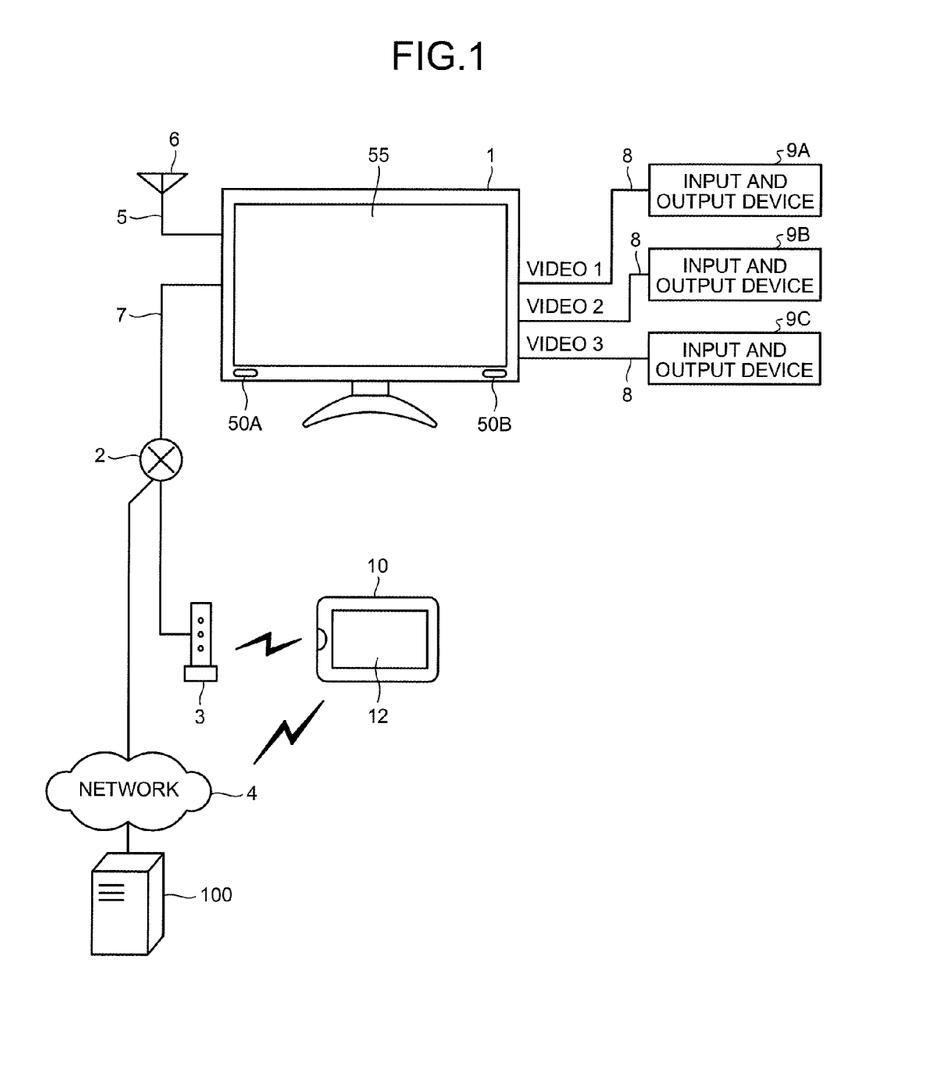
FIG. 1 is an exemplary system configuration diagram of a home network comprising an electronic device according to an embodiment.

FIG. 1 is a system configuration diagram illustrating a system example of home network comprising an electronic device according to an embodiment. The system illustrated in FIG. 1 comprises a television display device 1 as the electronic device, a wireless router 3, and a tablet 10 as a portable terminal. The television display device 1 is connected through a wireless or wired home network 2 at home. Wireless communication is performed between the wireless router 3 and the tablet 10 so as to connect the tablet 10 to the home network 2. With this, communication can be performed between the television display device 1 and the tablet 10.

A plurality of (for example, three) input and output devices (external devices) 9A to 9C for video and audio are connected to the television display device 1 with HDMI signal lines 8. Each of the input and output devices 9A to 9C and the television display device 1 has an HDMI terminal. The input and output devices 9A to 9C and the television display device 1 are connected to each other with the HDMI cables 8 as described above. The input and output devices 9A to 9C for video and audio accumulate or receive various contents of video and audio, and output them to the television display device 1 or an external speaker (not illustrated). Examples of the input and output devices 9A to 9C are a digital versatile disk (DVD) player, a DVD recorder, a hard disk drive (HDD) recorder, a set top box (STB) of CATV, and an amplifier for audio reproduction.

The television display device 1 selects a video or audio signal input to and output from one of the input and output device 9A, the input and output device 9B, and the input and output device 9C, by changing the input among video 1 for the input and output device 9A, video 2 for the input and output device 9B, and video 3 for the input and output device 9C. Any of the input and output devices 9A to 9C function as source devices, and the television display device 1 functions as a sink device on the HDMI standard.

To be more specific, for example, the input and output device 9A is assumed to be an HDD-DVD recorder in which an HDD recorder and a DVD recorder are integrated with each other, the input and output device 9B is assumed to be an amplifier for audio reproduction, and the input and output device 9C is assumed to be a set top box (STB) of CATV. In particular, a digital television tuner is mounted on each of the input and output devices 9A, 9C. Each of the input and output devices 9A, 9C outputs data stored in each storage medium, or a video or audio signal obtained from broadcast waves input from an antenna to the television display device 1 through the HDMI cable 8.

The tablet 10 is connected to a network 4 such as the Internet using a mobile communication technique such as third-generation (3G) communication or the wireless router 3. Furthermore, the tablet 10 has a function of acquiring various pieces of information from a server 100 on the network 4.

It is to be noted that a mobile communication terminal such as a smartphone, a mobile PC, or the like may be used as the portable terminal instead of the tablet 10.

Furthermore, as will be described in detail later, the tablet 10 also functions as a remote controller for remotely controlling each of the input and output devices 9A to 9C connected to the television display device 1 through the home network 2.

That is to say, the television display device 1 can receive an operation signal from the tablet 10 which is operated by a user through the home network 2. The television display device 1 sends a control command based on the HDMI-CEC to each of the input and output devices 9A to 9C based on the operation signal. With this, the television display device 1 can perform various controls on the input and output devices 9A to 9C, for example.

First, the tablet 10 is explained.

Figure 2:
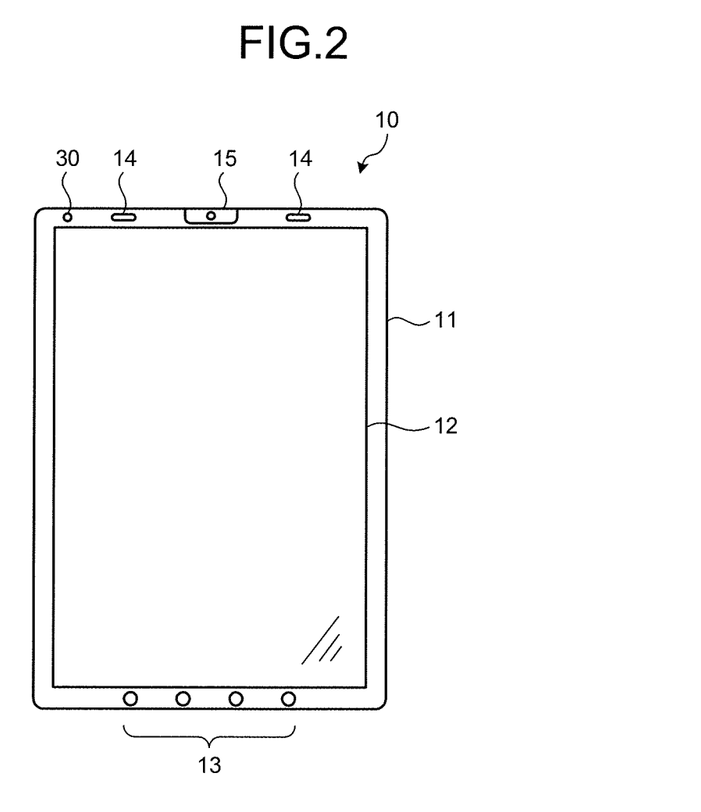
FIG. 2 is an exemplary plan view of an appearance of a tablet in the embodiment.

FIG. 2 is a plan view illustrating an example of an appearance of the tablet 10. The tablet 10 comprises a thin box-shaped housing 11 that is held by a user. The tablet 10 comprises a display module 12 that displays information on a front surface (one main surface) of the housing 11. The display module 12 comprises a touch panel that detects a position on a display screen that has been touched by the user.

Furthermore, the tablet 10 comprises an operation switch 13. The operation switch 13 is located on a front surface of the housing 11 at a lower side of the display module 12, and the user performs various operations with the operation switch 13. In addition, the tablet 10 comprises speakers 14 for outputting audio. The speakers 14 are located on the front surface of the housing 11 at an upper side of the display module 12. Furthermore, the tablet 10 comprises a camera module 15 for capturing an image, at an upper portion of the housing 11. The camera module 15 comprises a front camera and a rear camera. An image at the front surface side of the housing 11 is captured with the front camera and an image at the rear surface (the other main surface) side of the housing 11 is captured with the rear camera.

Moreover, the tablet 10 comprises a microphone 30 as an audio collector for collecting audio. The microphone 30 is located on the front surface of the housing 11 at the upper side of the display module 12.

Figure 3:
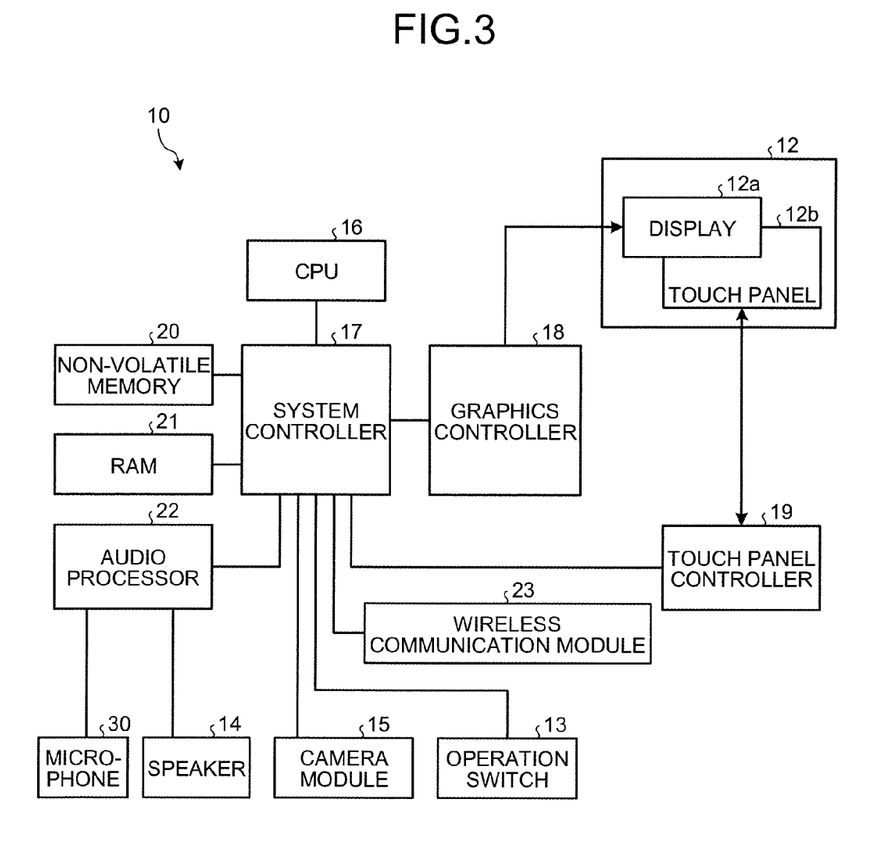
FIG. 3 is an exemplary block diagram of a hardware configuration of the tablet in the embodiment.

FIG. 3 is a block diagram illustrating an example of a hardware configuration of the tablet 10. As illustrated in FIG. 3, the tablet 10 comprises a central processing unit (CPU) 16, a system controller 17, a graphics controller 18, a touch panel controller 19, a non-volatile memory 20, a random access memory (RAM) 21, an audio processor 22, and a wireless communication module 23 in addition to the above-described configuration.

The display module 12 is configured as a so-called touch screen in which a display 12a and a touch panel 12b are combined. The display 12a is a liquid crystal display (LCD) or an electro luminescence (EL) display, for example. The touch panel 12b detects a position (a touch position) on a display screen of the display 12a that has been touched by a finger of the user or by a stylus pen.

The CPU 16 is a processor that controls operations of the tablet 10 overall. The CPU 16 controls each portion of the tablet 10 through the system controller 17. The non-volatile memory 20 stores therein an operation system, various application programs, various pieces of data necessary for executing the programs, and the like. The RAM 21 provides an operation area when the CPU 16 executes the programs as a main memory of the tablet 10.

The CPU 16 executes the operation system and various application programs loaded on the RAM 21 from the non-volatile memory 20 so as to realize the function for controlling each portion of the tablet 10, for example. In the embodiment, in particular, the CPU 16 executes an application program (hereinafter, referred to as "a remote operation application") for remotely operating an operation environment and the like relating to video processing and audio processing of each of the input and output devices 9A to 9C on the television display device 1 so as to realize device operation control processing (see FIG. 5 to FIG. 7), which will be described later.

The system controller 17 incorporates a memory controller that controls accesses to the non-volatile memory 20 and the RAM 21. Furthermore, the system controller 17 has a function of performing communication with the graphics controller 18, the touch panel controller 19, and the audio processor 22. In addition, the system controller 17 has a function of inputting information of a user operation that has been received by the operation switch 13 and image information from the camera module 15. Furthermore, the system controller 17 has a function of acquiring various pieces of information from outside of the tablet 10 using the wireless communication module 23.

The graphics controller 18 is a display controller that controls the display 12a of the display module 12. The touch panel controller 19 controls the touch panel 12b so as to acquire coordinate data indicating a touch position by the user from the touch panel 12b.

The audio processor 22 performs process of outputting audio guidance or the like generated by audio processing such as audio synthesis, from the speaker 14. Further, the audio processor 22 performs process on audio collected by the microphone 30 under control by the CPU 16.

The wireless communication module 23 performs wireless communication with the television display device 1 through the wireless router 3 and wireless communication for connecting to the network 4, under control by the CPU 16.

Next, the television display device 1 is described.

As illustrated in FIG. 1, the television display device 1 comprises speakers 50A and 50B that output audio. An antenna line 5 connected to an antenna 6, and a cable 7 connected to the home network 2 are connected to the television display device 1.

Figure 4:
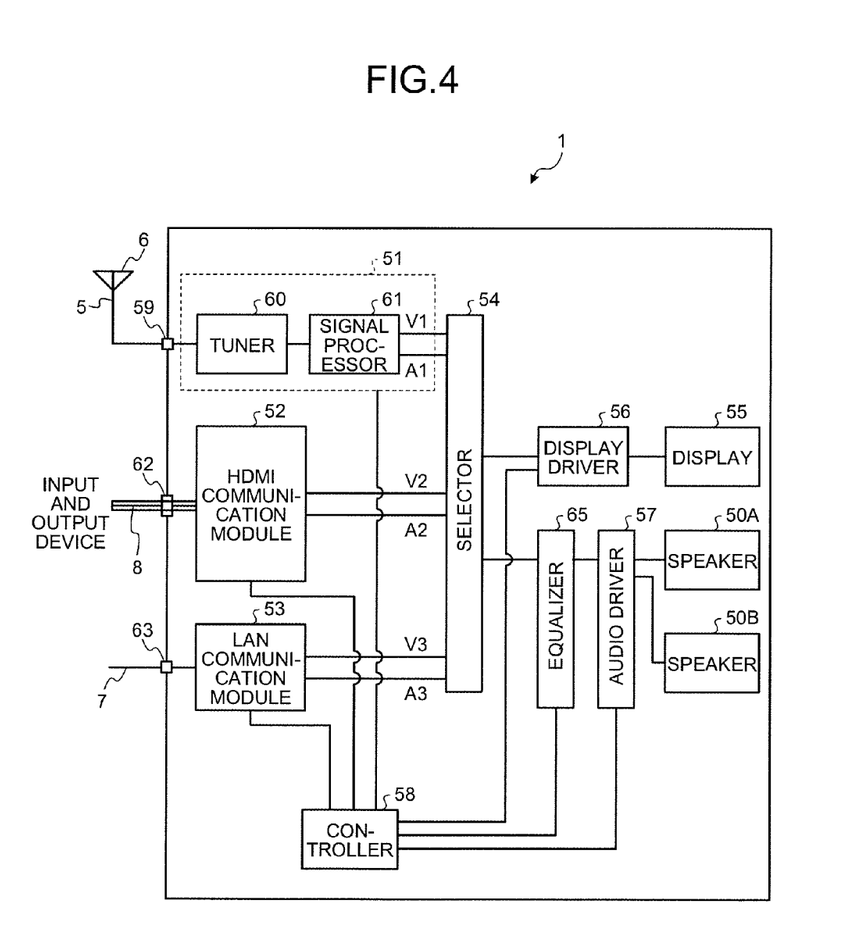
FIG. 4 is an exemplary block diagram of a hardware configuration of a television display device in the embodiment.

FIG. 4 is a block diagram illustrating an example of a hardware configuration of the television display device 1. As illustrated in FIG. 4, the television display device 1 comprises a television function module 51, an HDMI communication module 52, a local area network (LAN) communication module 53, a selector 54, a display driver 56, an equalizer 65, an audio driver 57, and a controller 58. The television function module 51 receives a television broadcast signal. The HDMI communication module 52 is a communication device that sends and receives a digital video signal in accordance with the HDMI standard. The LAN communication module 53 receives an internet protocol television (IPTV) transmitted through the home network 2. The selector 54 selects outputs of the television function module 51, the HDMI communication module 52, and the LAN communication module 53. The display driver 56 displays a video image on a display 55 based on a video signal output from the selector 54. The equalizer 65 is a frequency characteristic adjusting module that adjusts a frequency characteristic of an audio signal output from the selector 54. The audio driver 57 makes the speakers 50A and 50B output audio based on the audio signal adjusted by the equalizer 65. The controller 58 controls each portion of the television display device 1 overall.

The controller 58 comprises a central processing unit (CPU), a random access memory (RAM), and a non-volatile memory (all of them are not illustrated). The RAM provides an operation area on the CPU. Various pieces of set information, computer programs, and the like are stored in the non-volatile memory. The CPU executes various pieces of arithmetic processing in accordance with the computer programs so as to control the entire television display device 1. It is to be noted that the non-volatile memory of the controller 58 also functions as a device-specific information storage module 208 (see FIG. 5), which will be described later.

The television function module 51 comprises a tuner 60 and a signal processor 61. The tuner 60 receives a television broadcast signal by the antenna 6 connected to a television (TV) input terminal 59 via the antenna line 5, and extracts a signal of a predetermined channel. The signal processor 61 inputs a received signal output from the tuner 60 so as to restore the signal to a video signal V1 and an audio signal A1.

The HDMI communication module 52 separates a digital video signal of the HDMI standard that has been received from each of the input and output devices 9A to 9C such as the DVD recorder into a video component and an audio component. The input and output devices 9A to 9C are connected to connectors 62 through the HDMI cables 8. The HDMI communication module 52 outputs the separated video component and audio component as a video signal V2 and an audio signal A2, respectively. Note that only one connector 62 and HDMI cable 8 are illustrated in FIG. 4, but the connectors 62 and HDMI cables 8 are provided in practice.

The LAN communication module 53 receives an IPTV broadcast signal from the home network 2 and the network 4 through the cable 7 connected to a LAN terminal 63, and outputs a video signal V3 and an audio signal A3 that have been decoded from the received signal by a decoder (not illustrated).

The selector 54 has a function of switching to and selecting one of the video signal V1 and the audio signal A1, the video signal V2 and the audio signal A2, and the video signal V3 and the audio signal A3, and outputting the signals to the display driver 56 and the audio driver 57. Note that the video signal V1 and the audio signal A1 are output from the television function module 51, the video signal V2 and the audio signal A2 are output from the HDMI communication module 52, and the video signal V3 and the audio signal A3 are output from the LAN communication module 53.

The equalizer 65 adjusts a frequency characteristic of the digital audio signal output from the selector 54. The audio driver 57 converts the digital audio signal adjusted by the equalizer 65 to an analog audio signal which can be reproduced by the speakers 50A and 50B. Subsequently, the audio driver 57 outputs the analog audio signal to the speakers 50A and 50B so that the audio is reproduced.

The device operation control processing that is characteristic to the embodiment among various pieces of arithmetic processing that are performed by the tablet 10 and the television display device 1 is described below.

Figure 5:
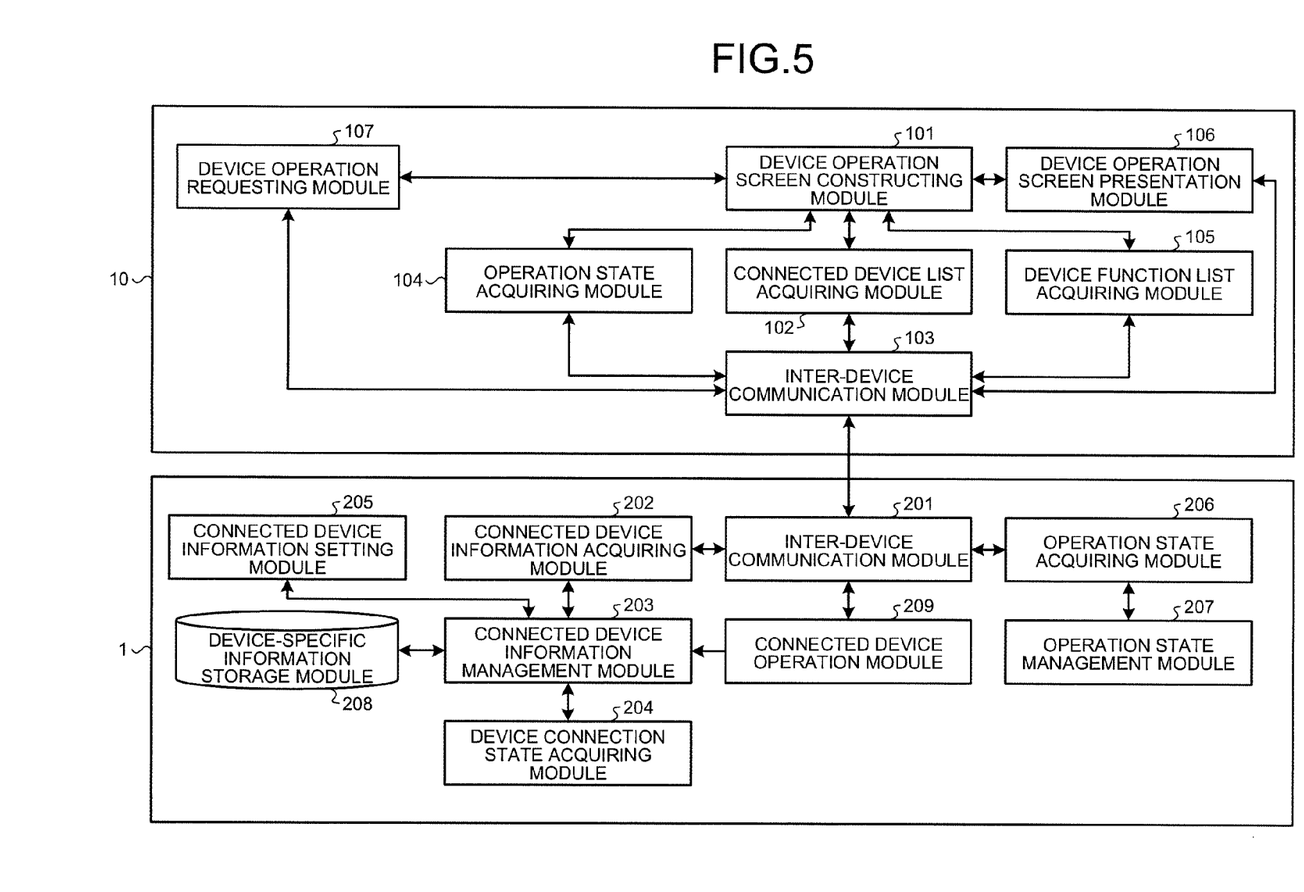
FIG. 5 is an exemplary block diagram of a functional configuration of device operation control processing in the embodiment.

FIG. 5 is a block diagram illustrating a functional configuration of the device operation control processing. As illustrated in FIG. 5, if the CPU 16 operates in accordance with the remote operation application, the tablet 10 realizes a device operation screen constructing module 101, a connected device list acquiring module 102, an inter-device communication module 103, an operation state acquiring module 104, a device function list acquiring module 105, a device operation screen presentation module 106, and a device operation requesting module 107.

On the other hand, as illustrated in FIG. 5, if the CPU of the controller 58 operates in accordance with the program, the television display device 1 realizes an inter-device communication module 201, a connected device information acquiring module 202, a connected device information management module 203, a device connection state acquiring module 204, a connected device information setting module 205, an operation state acquiring module 206, an operation state management module 207, the device-specific information storage module 208, and a connected device operation module 209.

Next, a function of each portion is schematically described. First, various functions for realizing the device operation control processing on the tablet 10 are described.

The inter-device communication module 103 sends and receives various commands (directions) to and from the television display device 1 through the home network 2.

The device operation requesting module 107 requests the device operation screen constructing module 101 to construct a device operation screen P (see FIG. 8) in accordance with an operation on the touch panel 12b of the display module 12 by a user. In addition, the device operation requesting module 107 requests the inter-device communication module 103 to communicate with the television display device 1.

The device operation screen constructing module 101 acquires various pieces of information through the connected device list acquiring module 102, the operation state acquiring module 104, and the device function list acquiring module 105 in order to construct the device operation screen P, in response to the request from the device operation requesting module 107. The device operation screen constructing module 101 determines a connected device that should be set as an operation target and a function that can be operated at the present time, based on the various pieces of information acquired through the connected device list acquiring module 102, the operation state acquiring module 104, and the device function list acquiring module 105.

The connected device list acquiring module 102 sends a command to acquire connected devices connected to the television display device 1 to the television display device 1 through the inter-device communication module 103. Then, the connected device list acquiring module 102 receives list information and device information of the connected devices (for example, the input and output devices 9A to 9C) connected to the television display device 1 from the television display device 1 through the inter-device communication module 103.

The operation state acquiring module 104 sends a command to acquire operation states of the television display device 1 with respect to the connected devices (for example, the input and output devices 9A to 9C) to the television display device 1 through the inter-device communication module 103. Then, the operation state acquiring module 104 receives the operation states of the television display device 1 with respect to the connected devices (for example, the input and output devices 9A to 9C) from the television display device 1 through the inter-device communication module 103. That is to say, the inter-device communication module 103 and the operation state acquiring module 104 function as an operation state receiver.

The device function list acquiring module 105 sends a command to acquire function information of the connected devices connected to the television display device 1, to the television display device 1 through the inter-device communication module 103. Then, the device function list acquiring module 105 receives the function information unique to each of the connected devices (for example, the input and output devices 9A to 9C) that have been confirmed to be connected to the television display device 1 by the connected device list acquiring module 102 from the television display device 1 through the inter-device communication module 103. That is to say, the inter-device communication module 103 and the device function list acquiring module 105 function as a connected device information receiver.

The device operation screen presentation module 106 receives: a connected device that should be set as a current operation target; and a function that can currently be operated from the device operation screen constructing module 101, and generate a device operation screen P. The connected device that should be set as the current operation target and the function that can curretnly be operated are determined by the device operation screen constructing module 101 based on the list information and the device information of the connected devices (for example, the input and output devices 9A to 9C), the operation states of the television display device 1, and the function information unique to each of the connected devices (for example, the input and output devices 9A to 9C), which are acquired from the television display device 1. Then, the device operation screen presentation module 106 displays the generated device operation screen P on the display 12a of the display module 12. If a user operates the touch panel 12b of the display module 12, the device operation screen presentation module 106 determines, from the device operation screen P, a connected device (for example, the input and output devices 9A to 9C) that is the target of operation and an instructed operation. Then, the device operation screen presentation module 106 automatically determines a command (direction) to be sent to the connected device (for example, the input and output devices 9A to 9C) that is the target of operation from a command group for remote operation, and sends the command (direction) to the television display device 1 as an operation request through the inter-device communication module 103.

Next, various functions for realizing the device operation control processing on the television display device 1 are described. The inter-device communication module 201 sends and receives various commands (directions) with respect to the tablet 10 through the cable 7 connected to the home network 2.

The device connection state acquiring module 204 searches each of the input and output devices 9A to 9C such as a DVD recorder connected through the HDMI cables 8, to acquire device information (name of main body, function information, and the like) unique to each of the input and output devices 9A to 9C. The device information unique to each of the input and output devices 9A to 9C can be acquired at the phase of establishment of a communication path of the HDMI, or the like. For example, the acquiring of the device connection state may be performed when the tablet 10 is connected to the home network 2 for the first time or when a new input and output device is added.

The connected device information setting module 205 sets various pieces of information to the input and output devices 9A to 9C that have been acquired by the device connection state acquiring module 204. Note that, even in a case of connection with a system other than the HDMI, the connected device information setting module 205 can set device information acquired by the device connection state acquiring module 204, manually or the like.

The connected device information management module 203 stores the unique device information (name of main body, function information, and the like) and various pieces of information set by the connected device information setting module 205 in the device-specific information storage module 208, in association with the input and output devices 9A to 9C acquired by the device connection state acquiring module 204.

If the connected device information acquiring module 202 receives the command to acquire a list of the connected devices (for example, the input and output device 9A to 9C) connected to the television display device 1 or the command to acquire function information unique to each of the connected devices (for example, the input and output device 9A to 9C) through the inter-device communication module 201, the connected device information acquiring module 202 searches the device-specific information storage module 208 through the connected device information management module 203 to acquire information, and outputs the information to the tablet 10 through the inter-device communication module 201. That is to say, the inter-device communication module 201 and the connected device information acquiring module 202 function as a connected device information sending module. Here, the list of the connected devices is sent from the tablet 10.

The operation state management module 207 manages operation states of the television display device 1 with respect to the connected devices (for example, the input and output devices 9A to 9C).

If the operation state acquiring module 206 receives the command to acquire the operation states of the television display device 1 sent from the tablet 10 through the inter-device communication module 201, the operation state acquiring module 206 acquires operation states of the television display device 1 with respect to the connected devices (for example, the input and output devices 9A to 9C) through the operation state management module 207, and sends the operation states to the tablet 10 through the inter-device communication module 201. That is to say, the inter-device communication module 201 and the operation state acquiring module 206 function as an operation state sending module.

The connected device operation module 209 interprets a command received by the inter-device communication module 201, and performs a functional operation (for example, channel switching, volume adjustment, reproduction start and stop, recording start and stop, programmed recording) specified by the request command.

Figure 6:
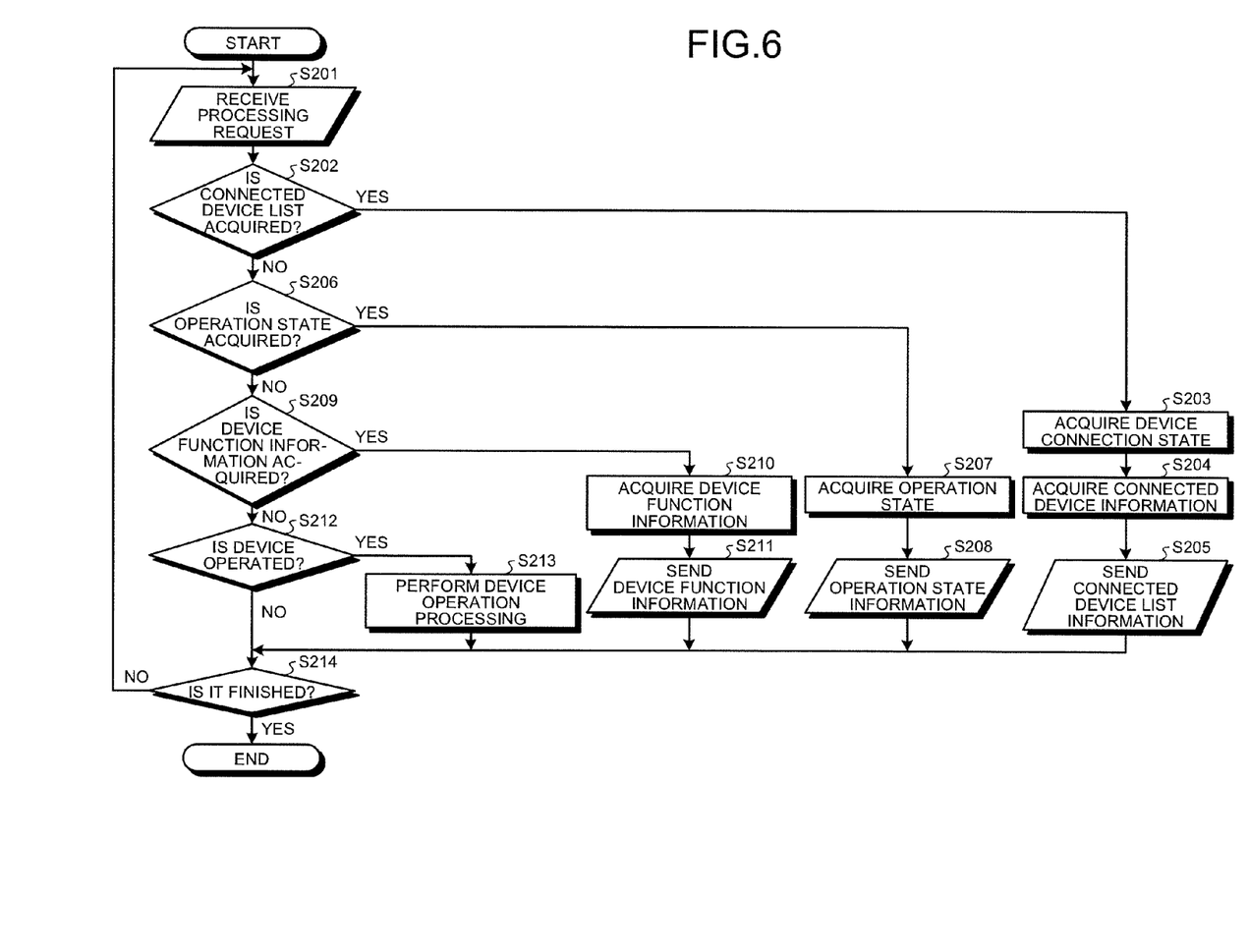
FIG. 6 is an exemplary flowchart of the device operation control processing on the television display device in the embodiment.

FIG. 6 is a flowchart illustrating the flow of the device operation control processing on the television display device 1. As illustrated in FIG. 6, on the television display device 1, the inter-devie communication module 201 receives a processing request based on various commands (directions) from the tablet 10 through the cable 7 connected to the home network 2 (S201). If the inter-device communication module 201 determines that the command is to acquire connected devices connected to the television display device 1 (Yes at S202), the connected device information acquiring module 202 searches the device-specific information storage module 208 through the connected device information management module 203 to acquire the connected devices (for example, the input and output devices 9A to 9C) (S203), and acquire device information (name of main body, and the like) unique to each of the connected devices (for example, the input and output devices 9A to 9C) (S204). Then, the connected device information acquiring module 202 sends list information and device information of the connected devices (for example, the input and output devices 9A to 9C) connected to the television display device 1, to the tablet 10 (S205).

If the inter-device communication module 201 determines that the command is to acquire operation states of the television display device 1 (Yes at S206), the operation state acquiring module 206 acquires operation states of the television display device 1 through the operation state management module 207 (S207), and sends the operation states of the television display device 1 to the tablet 10 (S208).

Alternatively, if the inter-device communication module 201 determines that the command is to acquire function information unique to each of the connected devices connected to the television display device 1 (Yes at S209), the connected device information acquiring module 202 searches the device-specific information storage module 208 through the connected device information management module 203 to acquire function information unique to each of the connected devices (for example, the input and output devices 9A to 9C) (S210). Then, the connected device information acquiring module 202 sends the function information of each of the connected devices (for example, the input and output devices 9A to 9C) connected to the television display device 1, to the tablet 10 (S211).

Furthermore, if the inter-device communication module 201 determines that the command is a request to operate one of the connected devices connected to the television display device 1 (Yes at S212), device operation processing for instructing the input and output device of the target of operation to opeate, is performed (S213).

Alternatively, if the inter-device communication module 201 determines that the command is to finish a reception waiting state for the processing requests (Yes at S214), the reception waiting state is finished.

Figure 7:
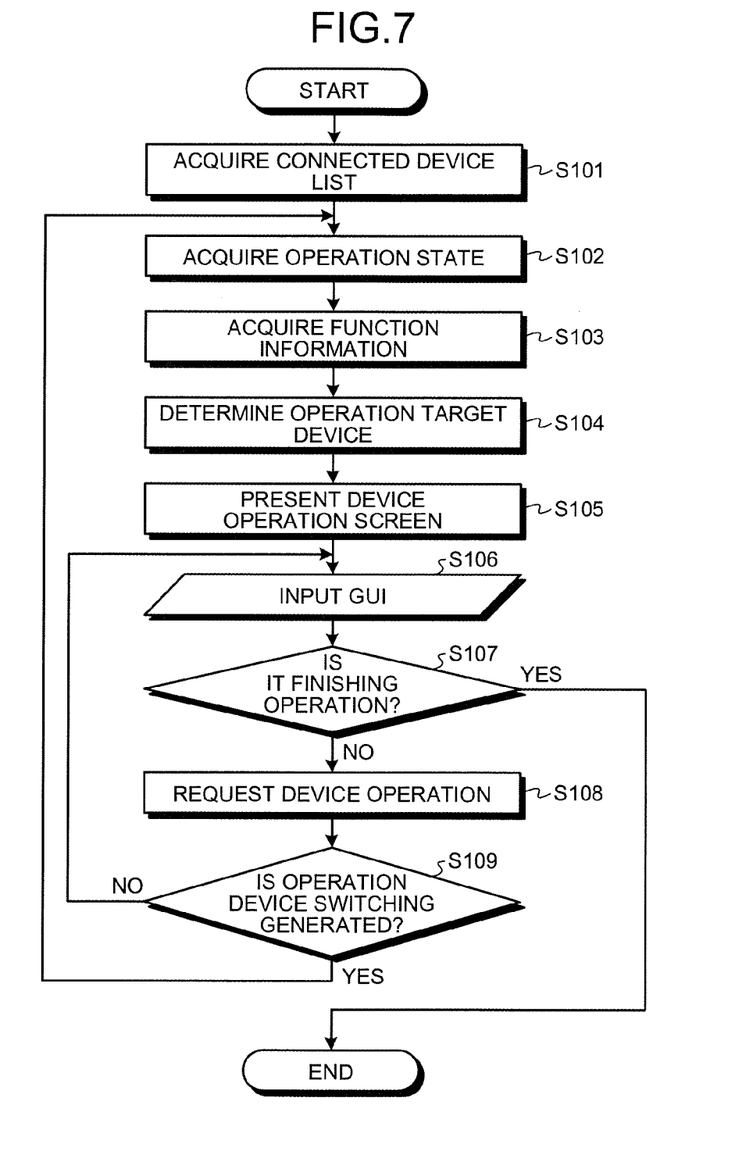
FIG. 7 is an exemplary flowchart of the device operation control processing on the tablet in the embodiment.

FIG. 7 is a flowchart illustrating the flow of the device operation control processing on the tablet 10. As illustrated in FIG. 7, on the tablet 10, at first, the connected device list acquiring module 102 acquires list information of the connected devices (for example, the input and output devices 9A to 9C) connected to the television display device 1 from the television display device 1, as information to construct the device operation screen P (S101).

Next, the operation state acquiring module 104 acquires operation states of the television display device 1 from the television display device 1 (S102).

Thereafter, the device function list acquiring module 105 acquires function information unique to each of the connected devices (for example, the input and output devices 9A to 9C) that have been checked to be connected to the television display device 1 from the television display device 1 (S103).

The device operation screen constructing module 101 determines a connected device that should be set as the current operation target and a function that can currently be operated, based on the list information of the connected devices acquired by the connected device list acquiring module 102, the operation states of the television display device 1 with respect to the connected devices (for example, the input and output devices 9A to 9C) acquired by the operation state acquiring module 104, and the function information unique to each of the connected devices acquired by the device function list acquiring module 105 (S104).

Subsequently, the device operation screen presentation module 106 receives the connected device that should be set as the current operation target and the function that can currently be operated from the device operation screen constructing module 101, to generate the device operation screen (GUI) P. Here, the connected device that should be set as the current operation target and the function that can currently be operated are determined by the device operation screen constructing module 101 based on the list information of the connected devices, the operation states of the television display device 1 with respect to the connected devices (for example, the input and output devices 9A to 9C), and the function information unique to each of the connected devices. Then, the device operation screen presentation module 106 displays the generated device operation screen P on the display 12a of the display module 12 in a user operable manner (S105).

Figure 8:
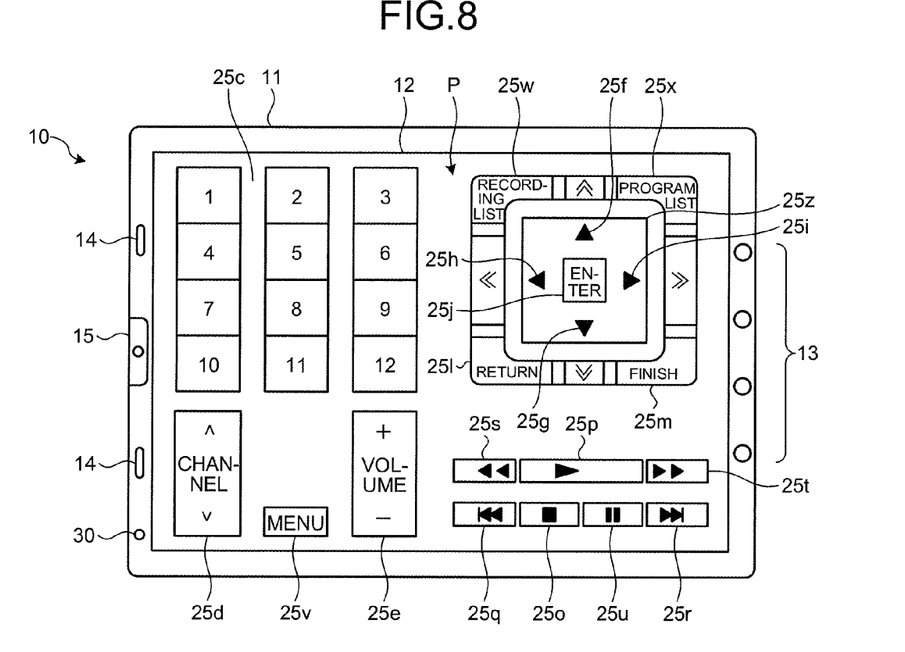
FIG. 8 is an exemplary plan view of a device operation screen in the embodiment.

FIG. 8 is a plan view illustrating an example of the device operation screen P. As illustrated in FIG. 8, on the device operation screen P, the graphical user interfaces (GUIs) corresponding to functions of the connected device (for example, the input and output devices 9A to 9C) displayed. Operations equivalent to those on a dedicated remote controller can be performed on the device operation screen P. The device operation screen P comprises the graphical user interfaces (GUIs) for performing functions of the connected devices (for example, the input and output devices 9A to 9C) regardless of a type of the connected devices (for example, the input and output devices 9A to 9C). Further, a GUI for performing a function of the connected device related to an operation state of the television display device 1 among the GUIs is preferentially displayed.

For example, on the device operation screen P as illustrated in FIG. 8, numeric keys 25c, a channel up and down key 25d, a volume adjustment key 25e, a cursor up key 25f, a cursor down key 25g, a cursor left key 25h, a cursor right key 25i, an enter key 25j, and the like are provided. It is to be noted that the cursor up key 25f, the cursor down key 25g, the cursor left key 25h, and the cursor right key 25i are formed as a so-called arrow key 25z.

Furthermore, on the device operation screen P, a reproduction stop key 25o, a reproduction key 25p, a backward skip key 25q, a forward skip key 25r, a fast-backward key 25s, a fast-forward key 25t, a pause key 25u, and the like, are provided.

In addition, a menu key 25v for displaying a menu screen of various functions that the television display device 1 has is provided on the device operation screen P.

When it has been recognized that the video signal V2 is input from the connector 62 to which the input and output device 9A (HDD-DVD recorder) is connected from the operation state of the television display device 1, the reproduction stop key 25o, the reproduction key 25p, the backward skip key 25q, the forward skip key 25r, the fast-backward key 25s, the fast-forward key 25t, the pause key 25u, and the like on the device operation screen P are made to correspond to operations of the input and output device 9A (HDD-DVD recorder) based on a reproduction function that the input and output device 9A (HDD-DVD recorder) has and the operation state thereof.

Even if the video signal V2 is not input from the input and output device 9A (HDD-DVD recorder), if there are no other connected devices with a reproduction function and the like, operations of the reproduction stop key 25o and the like on the device operation screen P are also made to correspond to operations of the input and output device 9A (HDD-DVD recorder).

On the other hand, if the video signal V2 is not input from the input and output device 9A (HDD-DVD recorder) and there exists other connected device with a reproduction function and the like, the operations of the reproduction stop key 25o and the like on the device operation screen P are made to correspond to operations of a device with higher priority among the devices. Here, the priority is preliminarily defined.

It is to be noted that, if for example there are no connected devices with a reproduction function, the reproduction stop key is not to be displayed on the device operation screen P as the GUI.

In the same manner, if it is recognized that the video signal V2 is input from the connector 62 to which the input and output device 9C (set top box of CATV) is connected from the operation state of the television display device 1, the numeric keys 25c, the channel up/down key 25d, the arrow key 25z, and the like on the device operation screen P are made to correspond to operations of the input and output device 90 (set top box of CATV), based on a broadcast reception function of the input and output device 9C (set top box of CATV) and the operation state thereof.

Furthermore, if it has been recognized that a audio signal is output to the connector 62 to which the input and output device 9B (amplifier for audio reproduction) from the operation state of the television display device 1, the volume adjustment key 25e and the like on the device operation screen P are made to correspond to the operations of the input and output device 9B (amplifier for audio reproduction), based on the audio output function of the input and output device 9B (amplifier for audio reproduction) and the operation state thereof.

That is to say, the tablet 10 can play, stop, and pause video, audio, and the like acquired from the input and output device 9A (HDD-DVD recorder) by making a user operate the reproduction stop key 25o, the reproduction key 25p, and the pause key 25u on the device operation screen P. In addition, the tablet 10 can skip forward or skip backward the video, audio, and the like currently being played by the input and output device 9A (HDD-DVD recorder) by a constant amount in the forward or reverse direction of the reproduction direction, by operating the backward skip key 25q or the forward skip key 25r on the device operation screen P. In addition, the tablet 10 can continuously fast forward or fast rewind the video, audio, and the like currently being played by the input and output device 9A (HDD-DVD recorder) at high speed in the forward or reverse direction of the reproduction direction, by operating the fast-backward key 25s or the fast-forward key 25t on the device operation screen P.

Furthermore, the tablet 10 can change a channel of the input and output device 9C (set top box of CATV) by making a user operate the numeric keys 25c, the channel up and down key 25d, or the arrow key 25z.

In addition, the tablet 10 can adjust a volume of the input and output device 9B (amplifier for audio reproduction) by making a user operate the volume adjustment key 25e.

As described above, the device operation screen P of the tablet 10 is configured so as to be able to operate a device connected to the television display device 1 via GUIs corresponding to the input and output state (operation state of the television display device 1), such as information on from which connector 62 of the television display device 1 the video signal is input or information on whether the audio signal is output through a connected device through the television display device 1. Therefore, a user can operate each of the connected devices (for example, the input and output devices 9A to 9C) connected to the television display device 1 without concerning about connection states of the devices and about which device can be operated.

In a state where the device operation screen P is displayed on the display 12a of the display module 12 of the tablet 10 in the above-described manner, if a user operates the device operation screen (GUI) P (S106), the device operation screen presentation module 106 determines whether the operation is a finishing operation (S107).

If the operation is the finishing operation (Yes at S107), the device operation screen presentation module 106 finishes the device operation control processing as it is.

On the other hand, if the operation is not the finishing operation (No at S107), the device operation screen presentation module 106 sends a command corresponding to a request of a device operation that has been specified by a user to the television display device 1 (S108).

Then, the device operation screen presentation module 106 determines whether the requested device operation content is an operation content that requires switching of an operation target device (S109). A case where the menu key 25v for displaying a menu screen of various functions that the television display device 1 has is operated is exemplified as the above-described content.

When the requested device operation content is an operation content that requires switching of an operation target device (Yes at S109), the process returns to S102, and the device operation screen presentation module 106 updates the device operation screen P in accordance with an operation state of the television display device 1.

On the other hand, when the requested device operation content is an operation content that does not require switching of the operation target device (No at S109), the process returns to S106, and the device operation screen presentation module 106 waits for an operation by the user on the device operation screen (GUI) P.

As described above, according to the embodiment, the tablet 10 acquires information on an input and output state (operation state of television display device 1), and determines an external device that can be operated in the present operation state of the television display device 1. Note that the information on the input and output state (operation state of television display device 1) includes: function information of each of the connected devices (for example, the input and output devices 9A to 9C) connected to the television display device 1, and information on from which connecter 62 of the television display device 1 a video signal is input; and information on whether an audio signal is output through a connected device other than the television display device 1. Furthermore, the tablet 10 comprises the GUIs for performing functions of the connected devices regardless of a type of the connected devices. The device operation screen P on which a GUI for performing a function of the connected device related to the operation state of the television display device 1 among the GUIs is preferentially displayed is presented in a user operable manner. With this, a user can operate each of the connected devices (for example, the input and output devices 9A to 9C) connected to the television display device 1 without concerning about connection states of the devices and about which device can be operated, and inhibiting a screen of the television display device 1 that is being viewed.

In the embodiment, the television display device 1 sends a control command based on the HDMI-CEC to each of the input and output devices 9A to 9C so as to perform various controls on the input and output devices 9A to 9C. However, the embodiment is not limited thereto, and the television display device 1 may perform various controls on the input and output devices 9A to 9C by using an infrared (IR) blaster.

Furthermore, in the embodiment, the television display device 1 is applied as an electronic device. However, the electronic device is not limited thereto and various input and output devices (for example, DVD player, DVD recorder, HDD recorder, set top box (STB) of CATV, amplifier for audio reproduction) may be applied as the electronic device.

The remote operation application to be executed on the tablet 10 as a portable terminal in the embodiment may be configured to be provided by being recorded in a recording medium that can be read by a computer, such as a compact disc-read-only memory (CD-ROM), a flexible disk (FD), a CD recordable (CD-R), or a digital versatile disk (DVD), in a format that can be installed or a format that can be executed.

Furthermore, the remote operation application to be executed on the tablet 10 in the embodiment may be configured to be provided by being stored in a computer connected to a network such as the Internet and being downloaded through the network. Alternatively, the remote operation application to be executed on the tablet 10 in the embodiment may be configured to be provided or distributed through network such as the Internet.

In addition, the remote operation application to be executed on the tablet 10 in the embodiment has module configurations comprising the above-described portions (the device operation screen constructing module 101, the connected device list acquiring module 102, the inter-device communication module 103, the operation state acquiring module 104, the device function list acquiring module 105, the device operation screen presentation module 106, the device operation requesting module 107). As actual hardware thereof, a CPU (processor) reads out the remote operation application from the ROM to execute it and the above-described parts are loaded on a main storage device so that the device operation screen constructing module 101, the connected device list acquiring module 102, the inter-device communication module 103, the operation state acquiring module 104, the device function list acquiring module 105, the device operation screen presentation module 106, and the device operation requesting module 107 are generated on the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable terminal comprising:
    a receiver configured to receive, from an electronic device, function information of a plurality of external devices, the external devices connected to the electronic device, and
        configured to receive, from the electronic device, an operation state of the electronic device with respect to the external devices; and
    a processor configured to
        determine, based on the function information and the operation state, one of the external devices as an operation target and operable functions of the operation target, and
        configured to present, in a user operable manner, a device operation screen comprising a plurality of graphical user interfaces (GUIs) for performing functions of external devices regardless of types of the external devices, a first GUI of the plurality of the GUIs usable for an operation of the operation target, a second GUI of the plurality of the GUIs not usable for an operation of the operation target, wherein
    the processor is configured to preferentially present the first GUI of the plurality of GUIs usable for an operation of the operation target.

2. The portable terminal of claim 1, wherein, if a plurality of external devices with operable functions redundant with one another are connected to the external device and operation states of the electronic device with respect to the external devices are equivalent to one another, the processor preferentially present one of the GUIs usable for an operation of one of the external devices having higher priority than other one of the external devices, the priority being preliminarily defined.

3. A computer program product having a non-transitory computer readable medium including programmed instructions, wherein the instructions, when executed by a computer, cause the computer to perform:
    receiving, by a receiver and from an electronic device, function information of a plurality of external device the external devices connected to the electronic device;
    receiving, by the receiver and from the electronic device, an operation state of the electronic device with respect to the external device;
    determining, by a processor and based on the function information and the operation state, one of the external devices as an operation target and operable functions of the operation target; and
    presenting, in a user operable manner by the processor, a device operation screen comprising a plurality of graphical user interfaces (GUIs) for performing functions of external devices regardless of types of the external device, one of the GUIs usable for an operation of the operation target, another one of the GUIs not usable for an operation of the operation target, wherein
    the processor is configured to preferentially present one of the GUIs usable for an operation of the operation target.

4. A device operation control method comprising:
    managing, by an electronic device, function information of a plurality of external devices, the external devices connected to the electronic device;
    sending, by the electronic device, the function information to a portable terminal in response to a transmission request from the portable terminal;

receiving, by the portable terminal, the function information from the electronic device;

sending, by the electronic device, an operation state of the electronic device with respect to the external devices in response to a transmission request from the portable terminal;

receiving, by the portable terminal, the operation state from the electronic device;

determining, by the portable terminal and based on the function information and the operation state, one of the external devices as an operation target and operable functions of the operation target; and presenting, in a user operable manner by the portable terminal, a device operation screen comprising a plurality of graphical user interfaces (GUIs) for executing functions of external devices regardless of types of the external device, one of the GUIs usable for an operation of the operation target, another one of the GUIs not usable for an operation of the operation target, wherein presenting comprises preferentially presenting one of the GUGs usable for an operation of the operation target.

* * * * *